United States Patent
Stiscia et al.

(10) Patent No.: US 7,881,458 B2
(45) Date of Patent: Feb. 1, 2011

(54) METHOD AND APPARATUS FOR ADAPTIVE HYBRID TERMINATION IN A MULTI-CARRIER COMMUNICATION SYSTEM

(75) Inventors: James J. Stiscia, Garner, NC (US); Vinson Go, Raleigh, NC (US)

(73) Assignee: Ikanos Communications, Inc., Fremont, CA (US)

( * ) Notice: Subject to any disclaimer, the term of this patent is extended or adjusted under 35 U.S.C. 154(b) by 1663 days.

(21) Appl. No.: 10/947,600

(22) Filed: Sep. 22, 2004

(65) Prior Publication Data

US 2005/0232300 A1    Oct. 20, 2005

Related U.S. Application Data

(63) Continuation of application No. 09/516,114, filed on Mar. 1, 2000, now abandoned.

(51) Int. Cl.
   *H04M 9/00* (2006.01)
(52) U.S. Cl. ........................ 379/402; 379/398
(58) Field of Classification Search ............... 375/219, 375/222, 295, 316; 379/402, 406.01, 406.05
See application file for complete search history.

(56) References Cited

U.S. PATENT DOCUMENTS

| | | | | |
|---|---|---|---|---|
| 5,185,736 A | * | 2/1993 | Tyrrell et al. | 370/358 |
| 5,521,908 A | * | 5/1996 | Younce et al. | 370/286 |
| 6,198,359 B1 | * | 3/2001 | Wichern | 331/117 R |
| 6,208,732 B1 | * | 3/2001 | Moschytz et al. | 379/402 |
| 6,509,755 B2 | * | 1/2003 | Hernandez-Marti | 326/30 |
| 6,510,152 B1 | * | 1/2003 | Gerszberg et al. | 370/352 |
| 6,618,480 B1 | * | 9/2003 | Polley et al. | 379/406.05 |
| 6,693,957 B1 | * | 2/2004 | Wingrove et al. | 375/222 |

* cited by examiner

*Primary Examiner*—Donald L Mills
(74) *Attorney, Agent, or Firm*—Thomas, Kayden, Horstemeyer & Risley, LLP

(57) ABSTRACT

An xDSL modem having an adaptive hybrid termination impedance. The modem has a transformer with two cores, one connected to the modem's receiver and the other connected to the modem's transmitter. The two cores share an adjustable termination impedance. The modem determines which impedance setting to use, based on one or more measurements of channel loss, local echo power and received power from the far end transmitter, and the like.

18 Claims, 8 Drawing Sheets

METHOD AND APPARATUS FOR ADAPTIVE HYBRID TERMINATION IN A MULTI-CARRIER COMMUNICATION SYSTEM

Continuation of prior application Ser. No.: 09/516,114 filed Mar. 1, 2000 now abandoned.

RELATED APPLICATIONS

NONE

TECHNICAL FIELD

The present invention is generally related to the field of digital communications across a transmission line. It is particularly suited to xDSL implementations which use two-wire to four-wire conversion to allow full duplex operation. Thus, the present invention applies to ADSL Lite (ITU G.992.2), ADSL DMT, (ITU G.992.1) and ANSI T1.413 Issue 2, among others.

BACKGROUND OF THE INVENTION xDSL modems, such as ADSL, HDSL, SDSL and VDSL, among others, are well-known in the prior art. In such modems, a signal is sent over a twisted pair communication line which links a first transceiver to a second transceiver. A pair of xDSL modems arranged to communicate with each other use at least one established communication protocol. One common communication protocol, found in ADSL and VDSL modems, is discrete multitone (DMT) modulation.

In DMT modulation, an xDSL transmitter typically takes a complex-valued signal and places it for transmission in a DMT bin. The signal's coordinates in the complex plane signify the information that is to be sent to the receiver. Thus, in a typical protocol, one encodes two bits (00, 01, 10 or 11) per frequency bin using the complex plane. In general, a collection of such signals, typically called a symbol, are simultaneously sent over a predetermined number of frequency bins, typically 128, 256 or 512, depending on the standard. The symbol can be sent downstream (from the ATU-C to the ATU-R) using a higher range of frequencies, or sent upstream (from the ATU-R to the ATU-C) using a lower range of frequencies.

In a given XDSL session between a pair of modems, the different frequency bins may experience different line noise levels. The noise level may depend on such factors as the crosstalk from other twisted pairs in a cable binder, and far end modem internal noise leakage, among other things, while the received signal level may depend on the length of the twisted pair transmission line. In the typical case, most frequency bins will have a signal-to-noise ratio that is sufficiently high to permit them to be used to transmit data. Other frequency bins, however, may have SNRs that are too low and so these frequency bins may not be used. These unused frequency bins represent bandwidth that is lost, and so it is generally recognized that the number of unused bins should be kept to a minimum, subject to maintaining good signal quality.

FIG. 1 shows a typical xDSL communication system 100 showing a central office modem 102, commonly designated CO or ATU-C (ADSL transmission unit-Central), connected to a remote customer premises equipment modem 104, commonly designated CPE or ATU-R (ADSL transmission unit-remote). The two modems 102, 104 are connected by a twisted pair transmission line 106, typically formed from copper or other conductor. The length of the twisted pair may vary, but is typically on the order of less than 20,000 feet, the length being dictated by the signal level transmitted from the far end transmitter, the cable attenuation of the transmitted signal, and the level of noise at the receiver Usually, in xDSL systems, one speaks of the "loop reach", which expresses the allowable separation between the ATU-C and the ATU-R at various data transmission rates, e.g., 12,000 ft@ 1 Mbit/sec, 14,000 feet@ 900 Kbit/sec). Longer loop reach generally means that one can serve more customers, and so it is considered to be desirable to extend the loop reach as much as possible, while still maintaining good data rates.

Although modem 102 and modem 104 may have some differences due to the nature of their roles, one at ATU-C and the other at ATU-R, they have many characteristics and capabilities in common. Both modems have EMI and safety circuitry 110a, 110b, line transformer and associated filters 112a, 112b, and a hybrid circuit 114a, 114b which couples the two wires' differential mode signal from the twisted pair to the four wires (two each for the transmitter circuitry and the receiver circuitry). In addition, each has receiver circuitry 116a, 116b comprising one or more amplifiers and filters, and also transmitter circuitry 118a, 118b, also comprising one or more amplifiers and filters.

The transmitter circuitry typically includes a line driver and filter. The filtering is the combination of analog and digital frequency/time domain shaping. The filtering limits the energy contained in the regions above and below the transmitter pass band frequencies. In the case of FDM ADSL located at the remote site ATU-R, the low pass transmitter filtering limits the upstream generated signal energy which falls into the same frequency spectrum as the downstream receive spectrum. The low pass filtering does not limit the harmonic and inter-modulation distortion generated by the line driver which falls into the receive bandwidth. The upstream signal is transferred to the twisted pair interface via the hybrid. The hybrid is a 2-wire to 4-wire converter in which the 2-wire twisted pair transmission line interface is converted to a 2-wire receiver interface and a 2-wire transmitter interface.

In most modems, some transmitter energy couples from the transmitter into the receiver via the hybrid. FIG. 2 shows a hypothetical channel for an ATU-R in which bins 6-29 are used for transmitting and bins 37-127 are used for receiving. The bins between 29 and 37 are not used because of the out-of-band energy 120 from the transmitter. Thus, these bins form a guard band, which represents unused bandwidth, and it is generally recognized that it is advantageous to reduce the width of this guard band to the extent possible. As also seen in FIG. 2, despite the presence of the guard band, some of the transmitter energy may still leak into the bins used by the ATU-R receiver. The amount of reduction of this energy between the transmitter output port and the receiver input port of the hybrid is known as trans-hybrid loss.

In the design of ADSL transceivers, it is generally preferred that the hybrid circuitry minimize the local transmitter energy that couples into the local receiver. Minimizing local transmitter energy into the local receiver reduces the dynamic range that the receiver must handle and improves the signal-to-interference (SNI) ratio. This results in an analog front end (AFE) requiring fewer analog-to-digital (ADC) bits in order to recover the desired signal from the far end transmitter, and also provides greater data carrying capacity for the end user. While minimizing this energy coupling, it is also desirable that the hybrid circuitry operate at the best impedance match possible to the twisted pair transmission line. The impedance presented at the line interface of an ADSL transceiver is a function of the twisted pair makeup and topology. This impedance can vary widely from loop to loop and a designer has no control over the range which a transceiver may need to operate.

The hybrid is typically a simple resistor, capacitor and inductor circuitry, normally fixed in value. As such, the trans-hybrid loss is a function of the termination impedance mismatch between the modem and the twister pair transmission line.

Typical values range from a 6 dB trans-hybrid loss for a poorly matched condition to 40 dB for a well matched condition. A wide range of termination impedances are provided to a modem by the twisted pair transmission line due to varying cable gauges, bridged taps, and other variable characteristics. As such, for a worst-case condition in a modem compliant with the G.992.1 or G.992.2 standard, it is possible for the upstream signal to couple into the receiver at a level as high as about +7 dBm. On an 18 kfeet loop (equivalent 26 AWG twisted pair) the received signal power at the twisted pair line interface would be only –60 dBm. The wide difference between undesired upstream echo power and desired downstream receive signal power requires system and hardware level tradeoff choices. Typically, a system level choice is made to insert a guard band between upstream and downstream signals. The hardware level choices include selection of line driver linearity, receive amplifier linearity, receive filtering levels relative to A/D converter requirements and receive filtering budgets with regards to receive amplifier linearity and low noise modem performance. The designer can trade line data capacity performance points against implementation costs and topologies.

FIG. 3 shows a prior art hybrid circuit. In FIG. 3, resistors R13 through R20 form a typical hybrid, or 2-wire to 4-wire converter. Of these, R16 and R19 are represent the line termination impedances, and are shown here as single resistors. In practice, however, these are frequently implemented as reactive terminations, i.e., combinations of Rs, Ls and Cs.

Much of a modem's communication functions are under the control of a signal processor. These communication functions may include such things as modulating and demodulating signals, echo cancellation, clipping mitigation, and filtering, among others. Thus, the signal processor is used to convert the transmitted and received digital signals from one form to another. The signal processor is typically implemented through a combination of hardware and executable software code. In the usual case, the signal processor includes a programmable computer, perhaps implemented as a reduced instruction set (RISC) computer, which handles only a handful of specific tasks. The computer is typically provided with at least one computer readable medium, such as a PROM, flash, or other non-volatile memory to store firmware and executable software code, and will usually also have an associated RAM or other volatile memory to provide workspace for data and additional software.

In the typical xDSL communication system, the signals handled by the signal processor are discrete multitone signals (DMTs) comprising N discrete tones simultaneously carried over the twisted pair. The collection of discrete tones is commonly referred to as a symbol, and a sequence of such symbols, spaced apart in time by a cyclic prefix, are transmitted in xDSL communications. A more detailed description of xDSL communication, xDSL transceivers and equalizers can be found in U.S. Pat. Nos. 5,285,474 and 5,479,447, both to Chow et al., whose contents are incorporated by reference to the extent necessary to understand the present invention.

SUMMARY OF THE INVENTION

The present invention is directed to an xDSL modem which tries to reduce the amount of local transmitter energy that couples into a local receiver during full duplex mode. The present invention helps attain such a modem through the use of an adjustable, or adaptive, hybrid transformer configuration at the CPE. The adaptive hybrid transformer configuration of the present invention adaptively adjusts impedance to match the line interface impedance to help maximize both power-transfer to the twisted pair, and also the "trans-hybrid loss", which is a measurement of the power coupling between the transmitter ports and receiver ports of the hybrid circuit.

In one aspect of the present invention, the trans-hybrid loss is measured and then the line termination is adjusted by selectively switching to a more suitable termination impedance for the line conditions. By operating in this manner, the impedance match between the transceiver and the line, as well as the trans-hybrid loss are improved over the operating range.

In another aspect of the present invention, the measurement-plus-adjustment process is carried out when an xDSL session is started, or restarted. Thus, the algorithm of the present invention is carried out during initialization or any time that the frequency equalizer or time domain equalizer taps must be trained or retrained.

In another aspect of the present invention, a dual transformer configuration having a first transformer connected to the CPE receiver, and a second transformer connected to the CPE transmitter, the transformers sharing a common adjustable hybrid termination port, is provided.

BRIEF DESCRIPTION OF THE DRAWINGS

The present invention can better be understood through the attached figures in which.

DETAILED DESCRIPTION OF THE INVENTION

Figure 1:
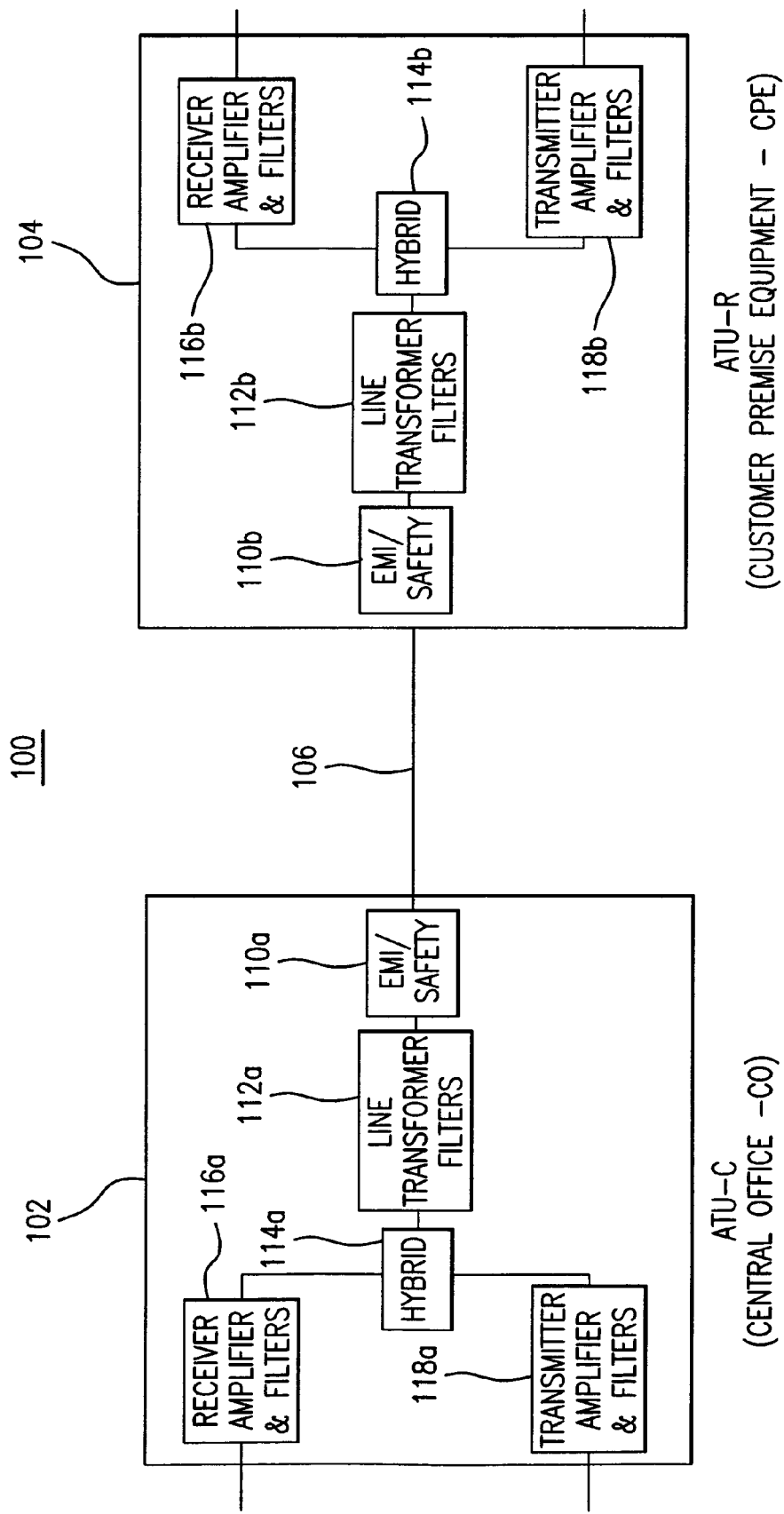
FIG. 1 presents a block diagram of a prior art XDSL modem.
Figure 2:
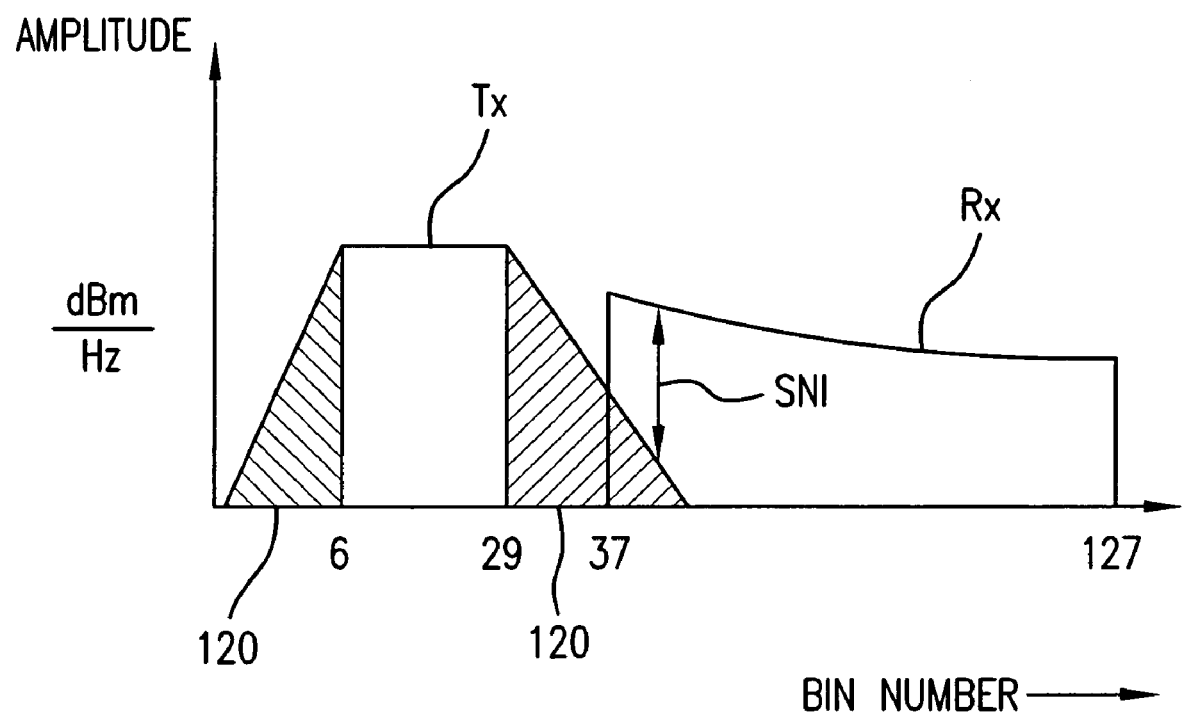
FIG. 2 presents the transmit and receive characteristics of a hybrid circuit from a hypothetical ATU-R modem.
Figure 3:
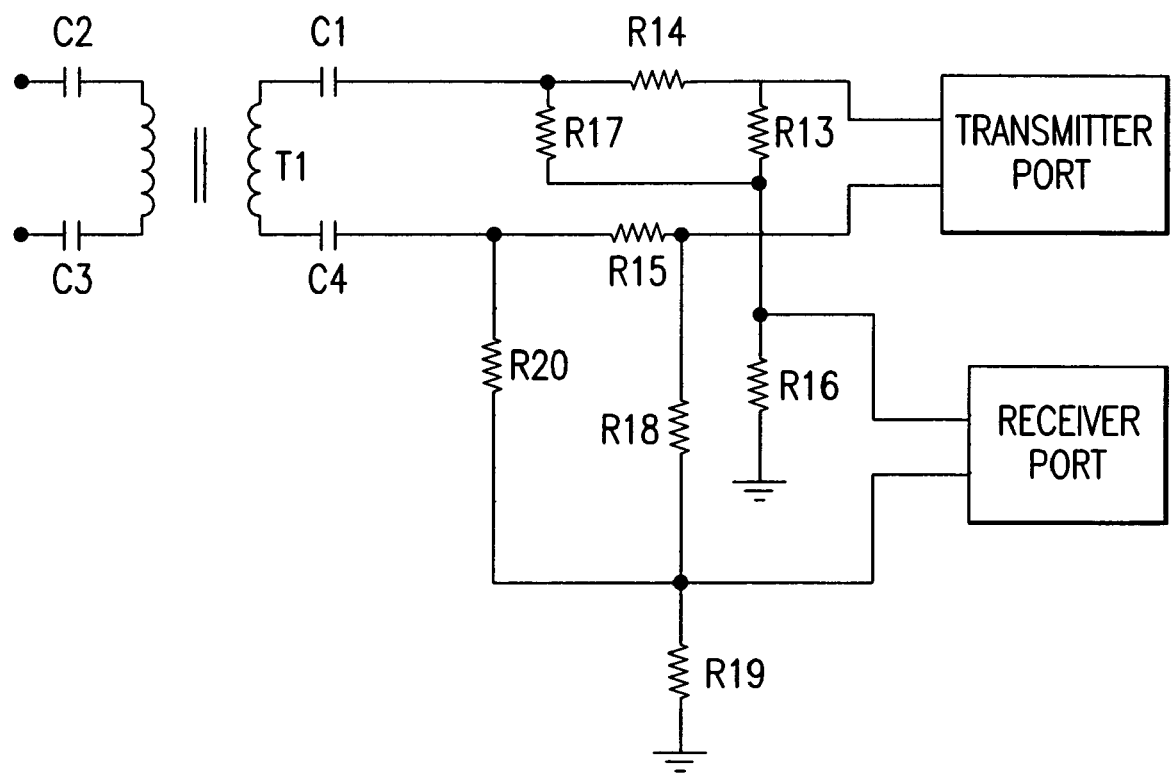
FIG. 3 presents a prior art hybrid circuit.
Figure 4:
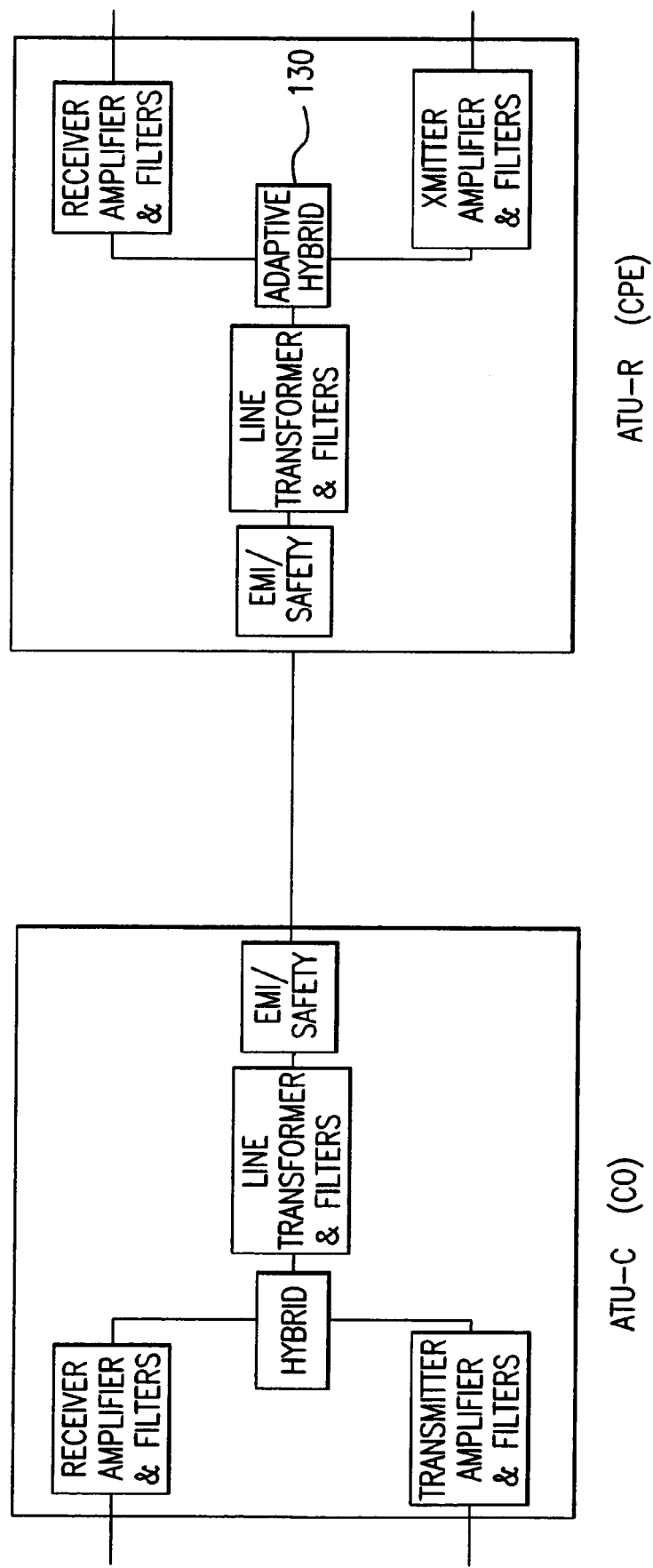
FIG. 4 presents a block diagram of an xDSL system in accordance with the present invention.

FIG. 4 shows a block diagram of an xDSL communication system in accordance with the present invention. More particularly, FIG. 4 shows the xDSL transmit/receive pathways between the central office and a customer premises modem in a system which includes an adaptive hybrid circuit 130. The principal difference between the block diagram of FIG. 4 and the prior art block diagram of FIG. 1 is the presence of the adaptive hybrid circuit 130 at the customer premises equipment.

Figure 5:
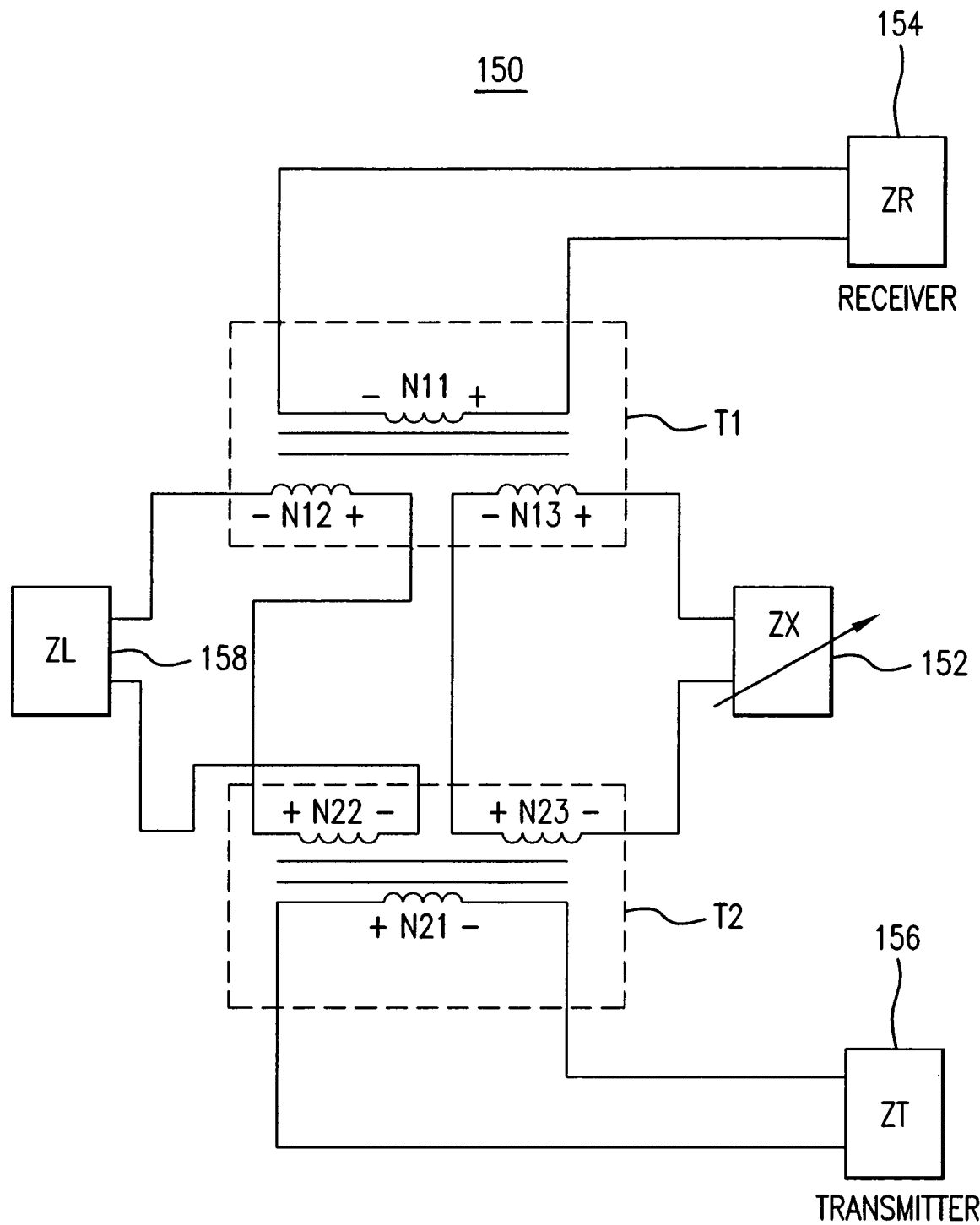
FIG. 5 presents a circuit diagram of an adaptive hybrid circuit in accordance with the present invention.

FIG. 5 shows the circuit diagram model of a modem having an adaptive hybrid circuit 150 in accordance with the present invention. The adaptive hybrid circuit preferably comprises a pair of transformers T1 and T2 and an adaptive impedance 152 of ZX for hybrid termination. As seen in FIG. 5, transformer T1 connects to the receiver section 154 (having impedance ZR) while transformer T2 connects to the transmitter section 156 (having impedance ZT). The two transformers T1,T2 are connected to provide conjugacy between alternate sets of ports, and provide impedance matching at each port. In a preferred embodiment, each transformer comprises a single primary coil and two secondary coils. Transformer T1's primary coil has N11 turns, while its secondary coils have N12 and N13 turns, respectively.

Similarly, transformer T2's primary coil has N21 turns, while its secondary coils have N22 and N23 turns, respectively. The adaptive hybrid circuit 150 of FIG. 5 allows received (downstream) signals from the twisted pair transmission line (having impedance ZL) to pass to the receiver section of the CPE modem with little loss, while concurrently allowing transmit (upstream) signals from the transmitter section of the CPE modem to the twisted pair transmission line with little loss. Concurrently, the adaptive hybrid circuit maximizes signal attenuation from the transmitter section to the receiver section (i.e., maximizes trans-hybrid loss) and thus mninimizes the signal leakage that passes through the hybrid from the transmitter section to the receiver section (i.e., minimizes the echo).

For a four-port hybrid transformer, the amount of hybrid loss can be determined by the bi-conjugacy between alternate sets of ports, and an impedance match at each port. Thus, the variable impedance ZX should match the impedance as seen by the phone line port of the hybrid, ZL. The adaptive hybrid is able to maximize trans-hybrid loss by means of an adjustable circuit 156 which permits switching among different sets of impedances. The adjustable circuit 156 is thus able to provide a best match to the phone line conditions 158, whose impedance ZL may vary from phone line to phone line, and also over time.

Figure 6:
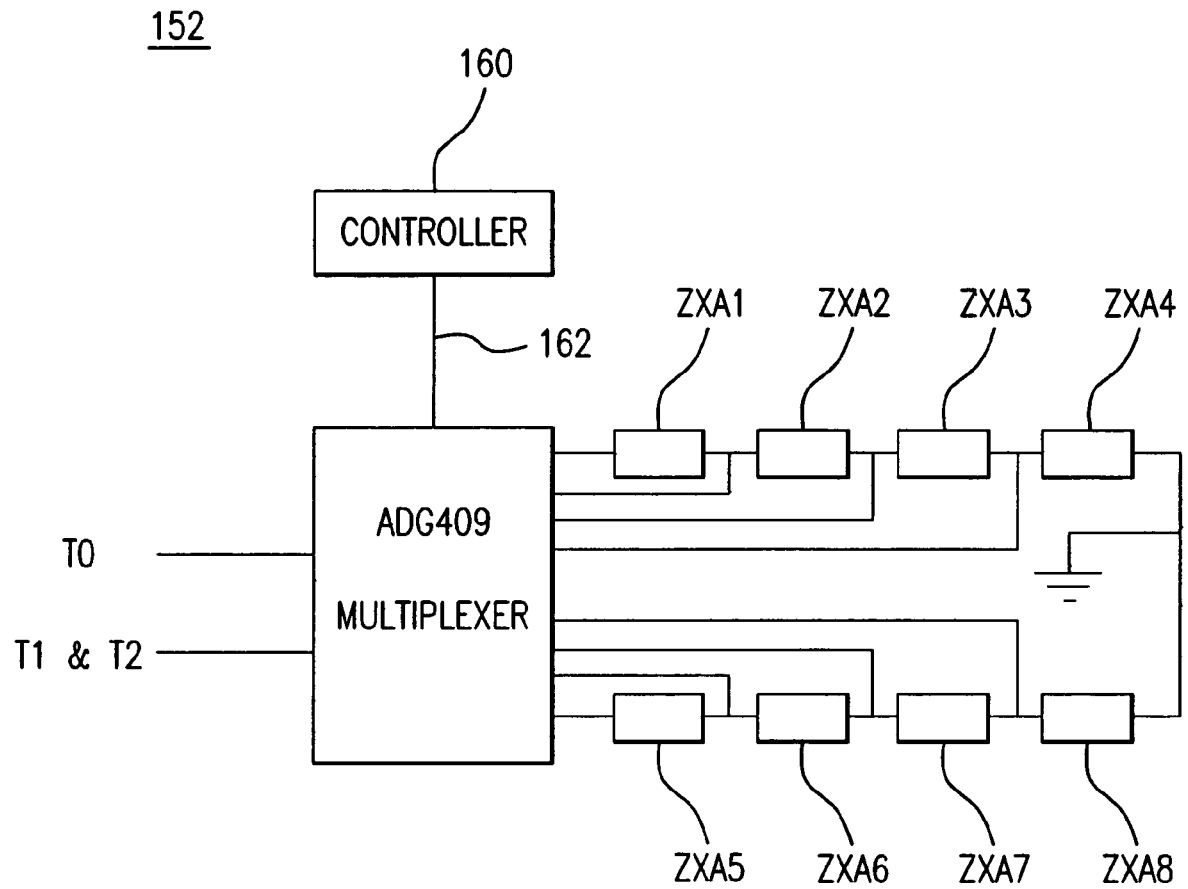
FIG. 6 presents a preferred embodiment of the adaptive impedance circuit of FIG. 5.

FIG. 6 shows a preferred embodiment for implementing the adaptive impedance 152 of ZX, seen in FIG. 5. The hybrid termination impedance is adjusted using feedback control from a controller 160. The controller 160 is preferably a processor, or the like, associated with the modem. The controller sends one or more signals along control line 162 to a switching device 164. In a preferred embodiment, the switching device 162 comprises an integrated analog multiplexer 164, such as the ADG409, made by Analog Devices. The ADG409 switches the termination port of the hybrid circuit to one of a finite number of discrete hybrid termination impedance values, in response to impedance control signals from the controller. Upon receiving such an impedance control signal, the ADG409 switches to one or more of the impedance elements ZXA1-ZXA8. Preferably, the impedance elements comprise one or more discrete components, such as resistors, capacitors and inductors, which can be used to match a wide range of impedances. In a more preferred embodiment, since a differential circuit is being used, one of four pairs of resistive impedance elements are selected.

While in the above described embodiment, discrete components providing discrete adjustments to the impedance are disclosed, it should be kept in mind that more sophisticated impedance devices may be used, instead. In these more sophisticated implementations, the impedances are continuously adjustable, rather than only providing discrete adjustments. Thus, the hybrid termination impedance may be changed to a hybrid termination impedance value within a predetermined continuous range. For example, devices such as a FET to help vary the channel resistance in response to a variable voltage, a varactor to vary channel capacitance, and a gyrator to vary channel inductance, may be used in various combinations to achieve such results. Preferably, such devices would be highly linear so as to provide fine control of the impedance. One may also be able to adapt adaptive equalizer chips normally intended to equalize transmission signals over coaxial or twisted pair cables for the purpose of impedance matching. Chip devices such as the CLC012 and CLC014 from National Semiconductor, and the LT1256 from Linear Technology are normally used "in-line" with the signal path, but may conceivably be used as termination devices. In such case, they, too, would provide a more continuous adjustment, rather than the discrete adjustment from using a multiplexer.

The benefit of the present invention can been illustrated analytically by means of a simplified case. With reference to FIG. 5, the simplified case assumes that the line impedance ZL, the receiver impedance ZR, the transmitter impedance ZT and the termination impedance ZX are all resistive only. Furthermore, it is assumed that N13 is proportional to N12 (N13=k·N13) and N22 is proportional to N23 (N22=a·N23). The equations governing port conjugacy are then given by:

$$ZR = \frac{a \cdot ZX}{k(1+a \cdot k)}\left(\frac{N11}{N12}\right)^2 = \frac{ZL}{(1+a \cdot k)}\left(\frac{N11}{N12}\right)^2 = \frac{a \cdot ZT}{k}\left(\frac{N11 \cdot N23}{N12 \cdot N21}\right)^2 \quad \text{(Eq. 1)}$$

$$ZX = \frac{k \cdot (1+a \cdot k) \cdot ZR}{a}\left(\frac{N12}{N11}\right)^2 = \frac{k}{a} \cdot ZL = (1+a \cdot k) \cdot ZT \cdot \left(\frac{N23}{N21}\right)^2 \quad \text{(Eq. 2)}$$

$$ZL = (1+a \cdot k) \cdot ZR \cdot \left(\frac{N12}{N11}\right)^2 = \frac{a}{k} \cdot ZX = \frac{a}{k} \cdot (1+a \cdot k) \cdot ZT \cdot \left(\frac{N23}{N21}\right)^2 \quad \text{(Eq. 3)}$$

$$ZT = \frac{k \cdot ZR}{a} \cdot \left(\frac{N12 \cdot N21}{N11 \cdot N23}\right)^2 = \frac{ZX}{(1+a \cdot k)}\left(\frac{N21}{N23}\right)^2 = \frac{k \cdot ZL}{a \cdot (1+a \cdot k)}\left(\frac{N21}{N23}\right)^2 \quad \text{(Eq. 4)}$$

For the above, the power ratio r is defined as r=a·k, and so the loss to the preferred port is given by:

$$PortLoss_{preferred} = 10 \log\left(\frac{r}{r+1}\right) \text{ (dB)} \quad \text{(Eq. 5)}$$

and for the preferred port, r>1. The loss to the non-preferred port is then given by $$PortLoss_{nonpreferred} = 10 \log\left(\frac{1}{r+1}\right) \text{ (dB)} \quad \text{(Eq. 6)}$$

In order to properly match the twisted pair line impedance ZL, the hybrid termination impedance ZX must be selected so as to provide a conjugate match. If a, k, ZX, ZR and ZT are selected properly with regard to ZL as per the previous equations, the trans-hybrid loss is automatically maximized. This has the effect of reducing upstream transmitter echo as well as line driver distortion coupling into the downstream receiver spectrum.

As is known to those skilled in the art, the three main noise sources which reduce SNR in the ADSL modem receive band are background noise, local transmit echo, and inter-modulation distortion. Background noise includes noise from the twisted pair environment, internal modem noise sources, near end cross talk (NEXT), and far end cross talk (FEXT). The local transmit echo consists of the upstream pass band signal, the out of band energy after filtering in the digital and analog domains, and the distortion products generated by the line driver both within the upstream transmit spectrum and the downstream receive spectrum.

The preferred embodiment of FIG. 6 uses a bank of hybrid termination impedances selected so as to minimize the transmit echo into the receiver. To perform the selection, the controller cycles through the bank of hybrid termination impedances during the appropriate initialization phase, and compares the echo with the background noise level. In particular, the controller selects that termination impedance which minimizes echo and maximizes receive signal level over the usable frequency range for the particular loop.

Figure 7:
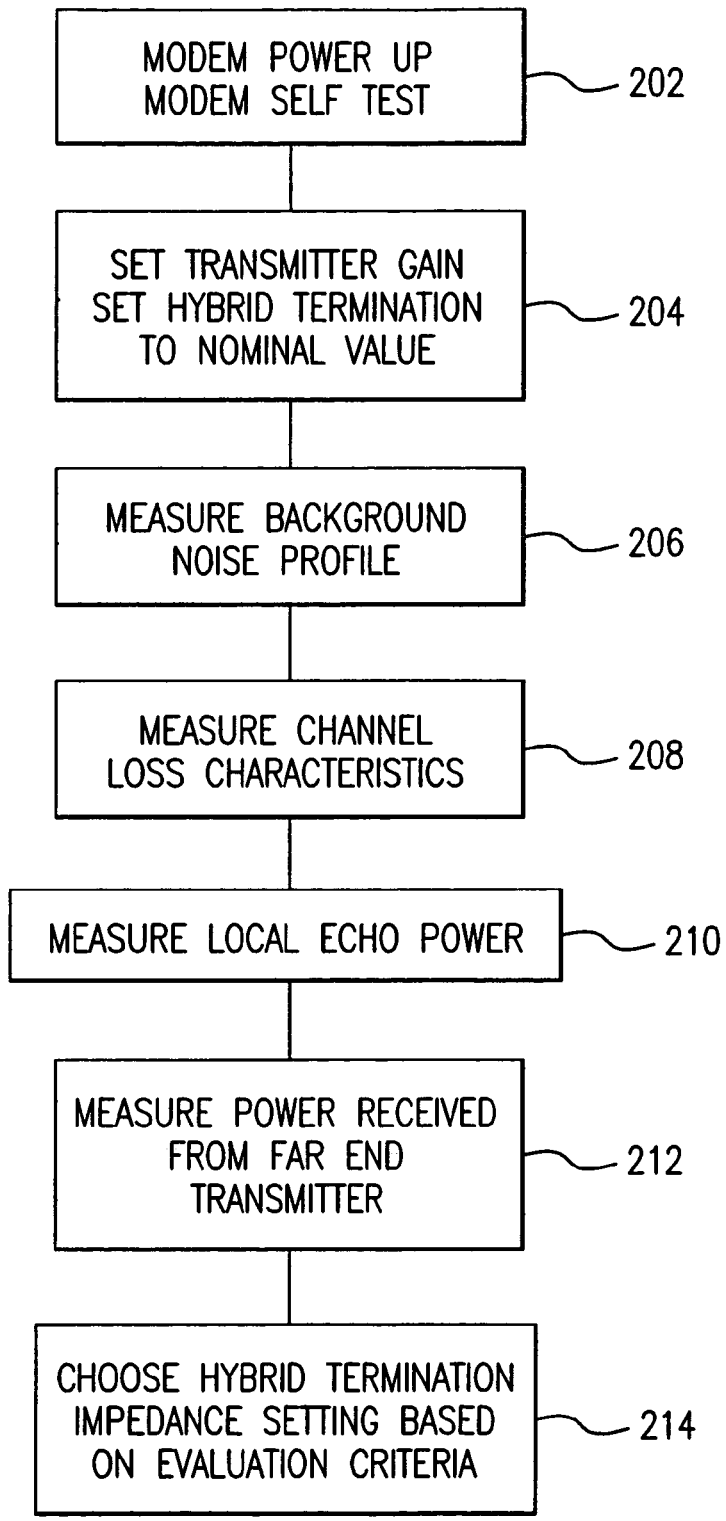
FIG. 7 is a flow chart of the steps involved in selecting a hybrid termination impedance in accordance with the present invention.

The general methodology for the controller to make this determination is now described with reference to FIG. 7, which presents a flow chart 200 of the termination impedance selection process. At step 202, the modem is powered up and performs a self-test, in the conventional manner. At step 204, the transmitter gain is set to a minimum and the hybrid termination is set to the nominal value (110 ohms) for a typical 26 AWG twisted pair.

At step 206, the background noise level profile is measured over the receiver frequency range. For this step, the receiver gain should be set to a high enough level so that the measurements are not limited by quantization noise. As is known to those skilled in the art, the background noise profile mainly consists of the noise on the twisted pair line and the internal noise of the modem which falls into the receiver spectrum. In a preferred embodiment, the background noise is measured by setting the transmitter to a 0 output level, setting the receiver gain to a known level, and performing an FFT in the frequency spectrum of the receiver (i.e. all the normally used receiver bins). Setting the receiver gain to a known level allows the absolute noise level to be determined. Cycling through the possible terminations allows the noise to be determined as a function of line termination as well as separate noise sources internal to the modem from noise sources external to the modem, since noise generated internally would not change level as a function of line termination.

At step 208, the channel loss characteristics are obtained and the "expected" SNR over the receiver frequency range is calculated, based on the background noise and the "expected" channel loss slope. In a modem following the G.992.2 standard, the received signal level can be measured during the limited bin transmission during the G.HS phase. The level of the bins that are actually transmitted by the far end transmitter during the G.HS phase is known. By performing an FFT (fast fourier transform) on the received waveform, one can then extrapolate the channel loss slope to bins above and below those actually transmitted during G.HS (to form the "expected" channel loss slope). Since we already know the background noise, we can then estimate an "expected" SNR. This is done by taking the difference between the expected power in every bin which would be received if all bins had been transmitted (rather than only the few bins sent during the G.HS phase minus the background noise level measured earlier. Analogous measurements may be made for modems following other standards.

At step 210, the local echo power is measured. This is done by turning on the local transmitter (in general, the transmitter of the CPE) to transmit a full bandwidth signal, and then measuring the local receiver echo power in each frequency bin, for each possible hybrid termination setting. It may, of course, be possible to skip testing all hybrid termination settings, if conditions so warrant.

At step 212, the power received locally from the far end transmitter is measured to determine how well the channel behaves. This is preferably gauged over all receiver frequencies and at all hybrid termination impedance settings. Finally, at step 214, the proper hybrid termination impedance setting is determined, based on the measured local echo power and the channel capacity. As is known to those skilled in the art, the channel capacity is a function of SNR in each bin. In general, the greater the SNR in a given bin, the more bits that can be carried for data. For instance, for ADSL, the total bit capacity from the user perspective is the total number of bits which can be carried on the link times the symbol rate of 4000. Thus, if the sum of all bits across all the bins=400 bits, the data capacity is 400×4000, or 1600 kbps for the user. The hybrid termination which results in the best "set of SNRs" across all the bins is the one that maximizes the bit loading (greatest number of bits which can be carried by the channel) and hence the user data capacity.

It should first be noted that the order of the above measurement steps is not critical. Thus, one may permute the order in which the various measurements are taken. It should also be noted that not all of the measurements must be made to decide upon the hybrid termination impedance setting. This is because the ultimate decision as to which hybrid termination impedance setting depends on one or more criteria, which can be evaluated based on one or more of the various measurements. The main objective, however, is to choose that hybrid termination impedance which maximizes the bit carrying capacity of the overall link. For this, one may use different criteria to decide upon the optimum hybrid termination impedance.

For example, maximizing the bit carrying capacity of the overall link may mean deliberately mismatching a particular portion of the receive spectrum with regards to trans-hybrid loss where is little channel SNR available any way, while maximizing trans-hybrid loss in another portion of the receive spectrum where more channel SNR is available. This criteria can be used when it makes sense to mismatch impedances at higher frequencies in order to further improve trans-hybrid loss at some lower frequencies where the net bit capacity increase would exceed the capacity loss at the higher frequencies. This might happen when the ATU-R is located is a place having high levels of interference in a particular frequency spectrum. Under other conditions, maximizing the bit carrying capacity may call for optimizing the receive spectrum over the entire frequency range such that margin across all bins is kept to some minimum number of dB provided the required link capacity is available. And if link capacity is above the requested service level any way, it might be more flexible to keep all the possible choices available just in case other crosstalk interferers come up later as the possibility to swap bits to other bins might be available. Other such tradeoffs may also be taken into account when deciding upon one or more criteria for selecting the "best" hybrid termination impedance.

Figure 8:
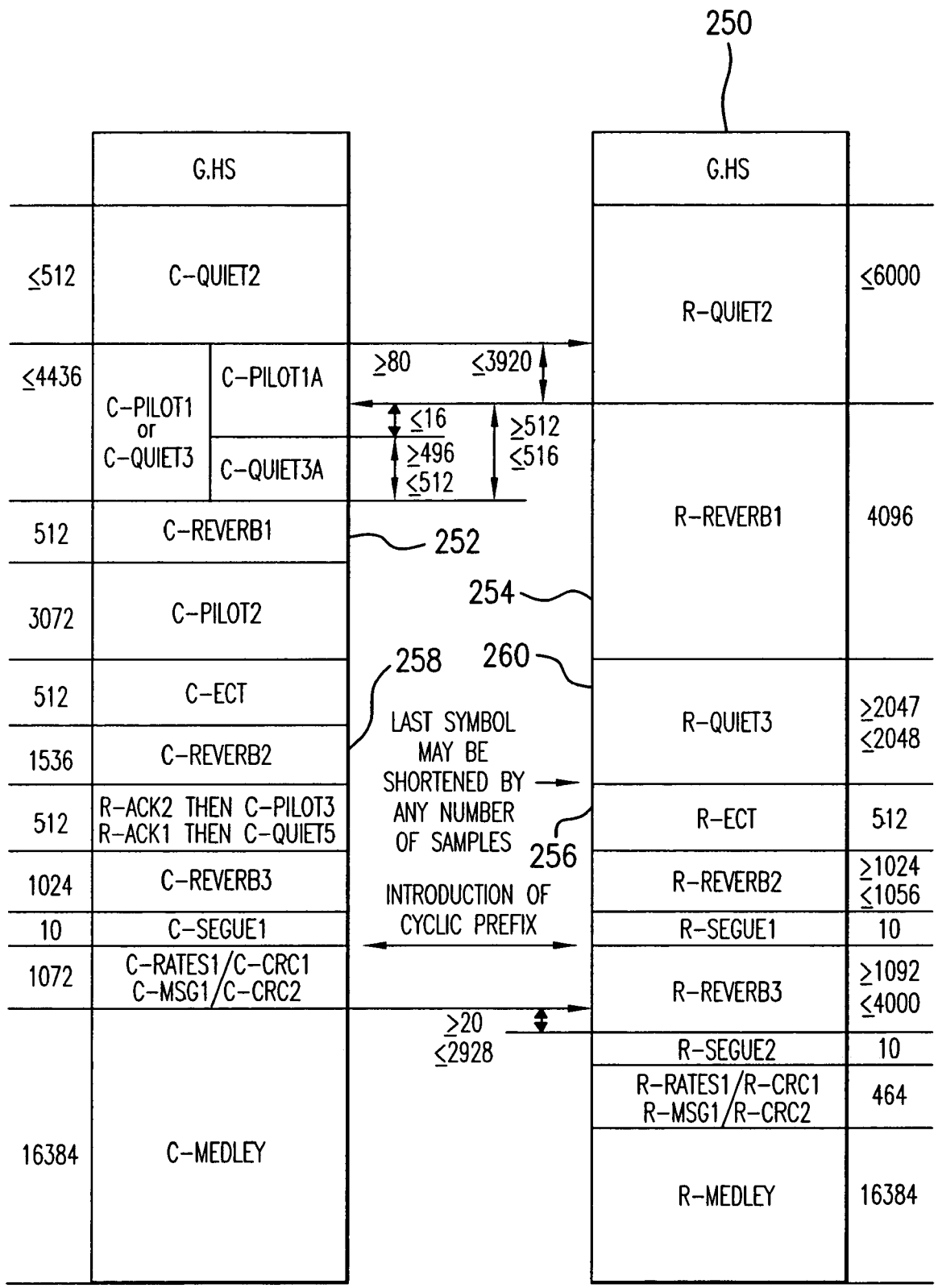
FIG. 8 is a timing diagram of the training process for a G.992.2 modem illustrating how the present invention can be used with such a modem.

The present invention may also be described with respect to implementing the above steps for use s with a modem designed to meet the G.992.2 specification. FIG. 8 is a timing diagram of the training process for a G.992.2 modem illustrating how the present invention can be used with such a modem. In the timing diagram of the FIG. 8, the phases on the left side of the figure, i.e., those beginning with a "C" designation, refer to phases at the ATU-C while the phases on the right side of the figure, i.e., those beginning with an "R" designation, refer to phases at the ATU-R. A preferred embodiment for implementing the present invention in on such a modem may proceed with the following steps and timing:

(1) As discussed above, the background noise profile is obtained after modem power up and self-test. These events take place prior to the training process, which begins with phase G.HS 250, as seen in FIG. 8.

(2) The channel loss characteristics and nominal hardware receiver settings are obtained during phase G.HS 250. The channel loss and the nominal settings can be further developed or refined during subsequent phases, such as phase C-REVERB1 252.

(3) The local echo power in the receiver frequency bins preferably are measured and computed during symbols of phase R-REVERB-1 254. Alternatively, phase R-ECT 256 may be used for this. This is done for each of the receiver frequency bins, for each possible hybrid termination impedance.

(4) If desired, the received power from the far end transmitter can also be measured and computed during phase C-REVERB2 258, which corresponds to phase R-QUIET3 at the ATU-C. This, too, is done for each of the receiver frequency bins, for each possible hybrid termination impedance.

(5) Finally, the hybrid termination impedance which maximizes the ratio of receiver power to Local Echo/Background Noise is then selected; the system can then be checked during phase R-ECT 256. Thereafter, the initialization sequence proceeds, as normal.

As discussed above, using an adjustable hybrid impedance may allow one to reduce upstream transmitter echo as well as line driver distortion coupling. Other possible benefits from this are that less guard band is required in an FDM system, lower resolution A/D converters may be used, lower order high pass filters may be used, and less stringent requirements for receiver amplifier linearity for a given level of performance. The present approach may also permit design tradeoffs between higher data capacity and reduced analog front end costs. Other benefits may also accrue from using the present invention.

The timing diagram of FIG. 8 pertains to a modem following the G.992.2 standard, and the steps presented above are suitable for this modem. However, the present invention is not limited to applications using this modem only. Timing sequences for modems following other standards may also be modified to accommodate the methodology of the present invention. Accordingly, modems following different standards may incorporate the necessary hardware and software required to implement the present invention.

Finally, while the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. An xDSL modem comprising:
    a hybrid circuit for interfacing the twisted pair transmission line to a receiver and to a transmitter, wherein the hybrid circuit comprises an adjustable termination impedance comprising at least one of a field effect transistor, a varactor, and a gyrator,
    wherein the adjustable termination impedance further comprises a controller for switching among hybrid termination impedance values based on an echo level resulting from signal leakage from a transmitter into the receiver within the xDSL modem and a signal level at the receiver.

2. The xDSL modem of claim 1, wherein the adjustable termination impedance comprises a multiplexer configured to selectively connect at least one transformer of said hybrid circuit to at least one discrete component.

3. The xDSL modem of claim 2, wherein the adjustable termination impedance comprises a multiplexer configured to selectively connect a pair of transformers of said hybrid circuit to at least two discrete components.

4. The xDSL modem of claim 2, wherein the multiplexer is connected to the controller configured to provide a signal to cause the multiplexer to selectively connect said at least one discrete component.

5. The xDSL modem of claim 1, wherein the hybrid circuit comprises first and second transformers, said first transformer being connected to said receiver and said second transformer being connected to said transmitter, and wherein said first and second transformers are both connected to said common adjustable termination impedance.

6. The xDSL modem of claim 5, wherein the adjustable termination impedance comprises a multiplexer configured to selectively and simultaneously connect both of said first and second transformers to at least one discrete component.

7. The xDSL modem of claim 6, wherein the multiplexer is connected to the controller configured to provide a signal to cause the multiplexer to selectively and simultaneously connect both of said first and second transformers to said at least one discrete component.

8. A method of operating an xDSL modem comprising:
    cycling through a plurality of hybrid termination impedance settings and for each setting, comparing an echo level resulting from signal leakage from a transmitter into a receiver within the xDSL modem with a background noise level noise function to determine noise as a function of line termination; and
    changing a hybrid termination impedance based on the cycling and comparing steps, the changing comprising adjusting a variable circuit component, the variable circuit component comprising at least one of a field effect transistor, a varactor, and a gyrator.

9. The method of claim 8, further comprising
    determining at least one of, a channel loss characteristic and local echo power.

10. The method of claim 9, wherein the hybrid termination impedance is changed to one from a finite number of discrete hybrid termination impedance values.

11. The method of claim 10, wherein the hybrid termination impedance is changed to a hybrid termination impedance value within a predetermined continuous range.

12. A system comprising:
    means for measuring at least one property of a communication channel connected to a modem;
    means for cycling through a plurality of hybrid termination impedance settings; and
    means for changing a hybrid termination impedance based on cycling through the plurality of hybrid termination impedance settings and a measurement of said at least one property, the means for changing comprising at least one of a field effect transistor, a varactor, and a gyrator, wherein the hybrid termination impedance is changed to a hybrid termination impedance value within a predetermined continuous range.

13. The system of claim 12, comprising
means for determining at least one of a background noise profile of the channel, a channel loss characteristic and local echo power; and
means for changing a hybrid termination impedance based on a result from the determining means.

14. The system of claim 13, wherein the hybrid termination impedance is changed to one from a finite number of discrete hybrid termination impedance values.

15. The system of claim 12, wherein the termination impedance is adjustable to maintain a margin across all bins to less than a specified level.

16. The modem of claim 1, wherein the termination impedance is adjustable to maintain a margin across all bins to less than a specified level.

17. The method of claim 8, wherein the hybrid termination impedance is changed such that a margin is maintained across all bins to less than a specified level.

18. The method of claim 8, wherein cycling through a plurality of hybrid termination impedance settings and for each setting is further performed to separate noise sources internal to the xDSL modem from noise sources external to the xDSL modem.

* * * * *